J. M. KROYER.
CLEAT FOR TRACTOR WHEELS.
APPLICATION FILED MAY 21, 1920.
1,395,432.
Patented Nov. 1, 1921.
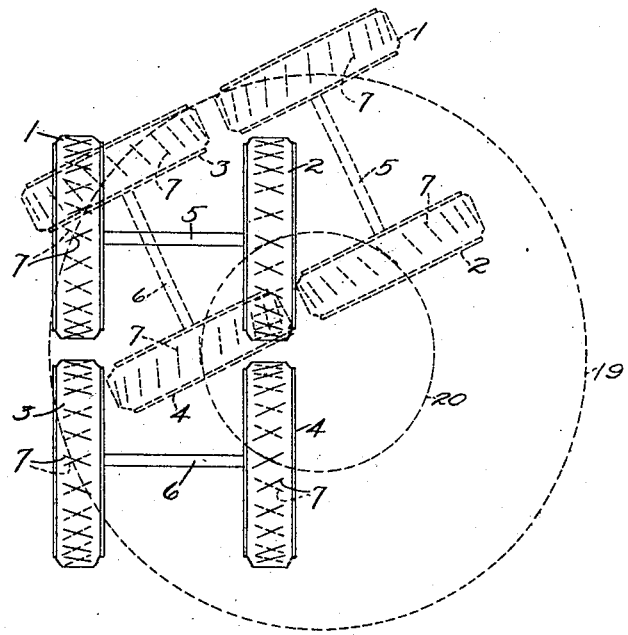
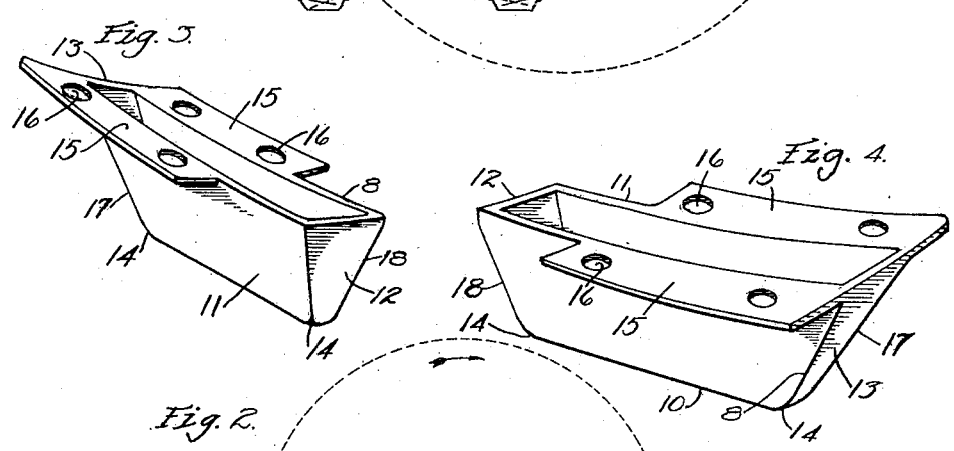
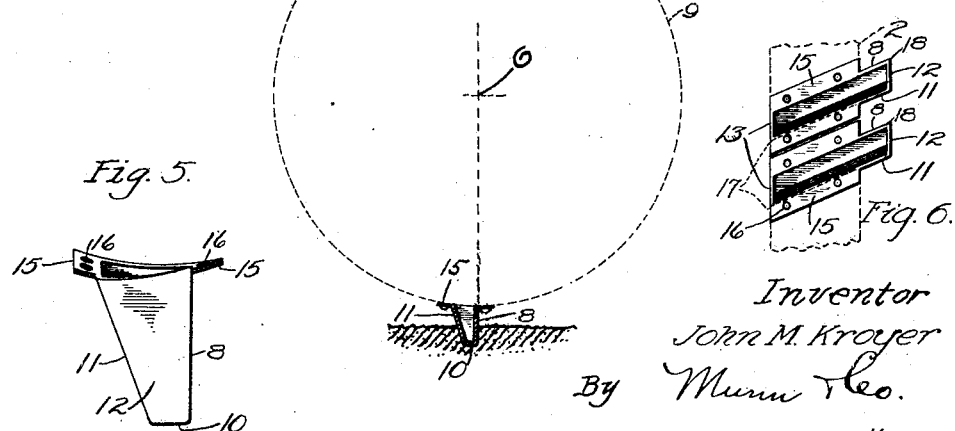
Inventor
John M. Kroyer
By Munn &co.
attys

UNITED STATES PATENT OFFICE.

JOHN MINOR KROYER, OF STOCKTON, CALIFORNIA.

CLEAT FOR TRACTOR-WHEELS.

1,395,432. Specification of Letters Patent. Patented Nov. 1, 1921.

Application filed May 21, 1920. Serial No. 383,181.

*To all whom it may concern:*

Be it known that I, JOHN MINOR KROYER, a citizen of the United States, and a resident of Stockton, in the county of San Joaquin and State of California, have invented a new and useful Improvement in Cleats for Tractor-Wheels, of which the following is a full, clear, and exact description.

My invention relates to improvements in cleats or grips for tractor wheels, and it consists in the combinations, constructions and arrangements herein described and claimed.

An object of my invention is to provide a cleat or grip which is especially designed for that type of tractor set forth in my prior Patent No. 1308790, of July 8, 1919. In said prior patent I have disclosed a tractor, the four wheels of which are mounted on rigid axles, power being applied to each wheel, and the wheels on either side being arranged to be released from the driving mechanism, whereby the device is caused to turn through the operation of the wheels on the other side to which power is being applied.

As disclosed in the above mentioned patent, there is a sled-like action when the tractor is turned, the cleats or grips acting as runners.

A further object of my invention is to provide a cleat or grip which permits of a sliding movement with a minimum of power, both ends of the cleat being beveled so that there is a lifting effect, tending to raise the wheels out of the ground, instead of causing the cleats or grips to plow through the ground, as they might do were such beveled ends not provided.

A further object of my invention is to provide a cleat which may be set at an angle with respect to the axis of the wheel, and which presents a sharp edge at either end of the cleat which is in line with the direction of movement as the vehicle is turned either when proceeding forwardly or when backing up.

A further object of my invention is to provide a cleat in which a maximum gripping effect is secured and in which the contour of the cleat permits it to be drawn out of the depression made in the soil, just as a pattern is drawn from the mold, *i. e.*, so as not to disturb the ground on either side of the depression, while, at the same time, securing a maximum tractive effect.

Other objects and advantages will appear in the following specification, and the novel features of the invention will be particularly pointed out in the appended claims.

My invention is illustrated in the accompanying drawings, forming part of this application, in which—

Figure 1 is a diagrammatic view showing four tractor wheels, and the manner in which the cleats or grips are arranged thereon, Fig. 2 is an end view of a cleat showing its relative position on a tractor wheel, Fig. 3 is a perspective view of the cleat looking from one end thereof, Fig. 4 is a perspective view of the cleat looking from the opposite end, Fig. 5 is an enlarged view showing the end of the cleat, and Fig. 6 is a diagrammatic view showing the relative position of the cleat with respect to the upper right hand wheel, as shown in Fig. 1, when the cleat is in the ground.

In carrying out my invention, I make use, as stated, of a tractor having four wheels, such as those shown at 1, 2, 3 and 4, and front wheels 1 and 2 being on a rigid axle 5, and the rear wheels 3 and 4 being on a rigid axle 6. A series of cleats 7 is arranged around the periphery of each wheel, those cleats on the front wheel 1 and the rear wheel 4 being arranged oppositely from the cleats on the front wheel 2 and the rear wheel 3, as fully set forth in the prior patent mentioned above.

The present invention has to do more particularly with the form of cleat used. It will be observed from Figs. 3 and 4 that the device consists of a body portion having a flat side 8 which, as will be seen from Fig. 2, is disposed on the wheel 9 (shown in dotted lines), so that the flat side 8 lies in a radial line through the center 0 of the wheel. The bottom 10 of the cleat is flat and of a sufficient width to permit the tractor to run on an asphalt pavement without destroying the appearance of the surface thereof. The face of the cleat opposite the flat face 8 is inclined thereto, as shown at 11. This permits the cleat or grip to be drawn out of the depression made by the grip without plowing up the ground. Each end of the cleat is beveled, as shown at 12 and 13, and the beveled ends are rounded at the bottom as at 14. Each of the cleats or grips is provided with flanges 15 having bolt holes 16, by means of which the cleat is secured to the periphery of the wheel. They are arranged so that the cleats which are gripping the ground, as, for instance, those shown in dotted lines in Fig. 1 on wheels 2 and 4, are tangent to a circle about which the machine is turning, as explained in my prior patent. This arrangement provides a sharp edge 17 (see Fig. 6) on one end of the cleat, and a sharp edge 18 on the other end diagonally opposite.

From the foregoing description of the various parts of the device, the operation thereof may be readily understood. As stated, the device is turned by throwing off power from the wheels on one line, as, for instance, the wheels 2 and 4 in Fig. 1. The wheels 1 and 3 are driven and their cleats travel in a circle which is indicated at 19. The cleats on the wheels 2 and 4 act as runners. They are tangent to the circle 20 about which the device turns. As the wheels 2 and 4 are moved, the cleats will tend to ride out of the ground, this being facilitated by the edges 17 and 18, so that the ground is not torn up, as it might otherwise be. The action is similar to the sharpened prow of a boat which is being driven through the water. As it is lifted, it meets with less resistance. The result is that the power necessary to turn the tractor is very materially cut down. The cleats or grips are so arranged on the wheels that the rear wheels will track with the front, that is to say, they will follow the same circle.

I have shown the body portion of the cleat as being hollow. This is for the purpose of illustration only. In practice it is desirable to make them hollow in order to save weight and material, but it is obvious that they might be made solid, without departing from the spirit of the invention. Under certain conditions there might be no need of making the bottom 10 of the cleat as wide as that shown, these matters of dimension however not effecting materially the principle upon which the device works.

I claim:

The combination with a wheel of a series of cleats secured to the rim, and disposed in angular relation with respect to the axis of the wheel, the opposed faces of the cleats inclining toward each other from the rim outwardly, the end edges of the cleats being parallel to the edges of the rim and the end faces of the cleats inclining toward each other from the peripheral surface of the rim outwardly.

JOHN MINOR KROYER.